UNITED STATES PATENT OFFICE.

GUSTAV ADOLF BOSSHARD, OF ARBON, SWITZERLAND, ASSIGNOR TO THE FIRM A.-G. SEERIET, BLEICHEREI, FILIALE ARBON, OF ARBON, SWITZERLAND.

PROCESS FOR IMPROVING COTTON FABRICS.

1,395,472.     Specification of Letters Patent.     Patented Nov. 1, 1921.

No Drawing.    Application filed July 9, 1920. Serial No. 395,101.

*To all whom it may concern:*

Be it known that I, GUSTAV ADOLF BOSSHARD, a citizen of the Republic of Switzerland, residing at Rebenstrasse 44, Arbon, Switzerland, have invented certain new and useful Improvements in Processes for Improving Cotton Fabrics; and I do hereby declare the following to be a clear, full, and exact description of the invention, such as will enable others skilled in the art to which it appertains to make and use the same.

It is a well known fact that the action of concentrated mineral acids on cotton fabrics causes the latter to assume a transparent parchment-like appearance. Mercer observed in 1844 that concentrated sulfuric acid of from 49.5 to 55.5° Bé. produces the above mentioned effect on cotton. Later on it has been established that transparent effects on cotton fabrics may be obtained by treating the fabrics alternately or subsequently with sulfuric acid of from 49 to 51° Bé. and with concentrated alkaline lyes.

Furthermore it is already known to replace sulfuric acid of from 49 to 50° Bé. by cooled hydrochloric acid of a specific gravity of 1.19, or by nitric acid of from 43 to 46° Bé., or by a zinc-chlorid solution of 66° Bé. at a temperature of from 60 to 70° C. or by a solution of cupric ammonia.

If nitric acid of a concentration of more than 42.3° Bé. (spec. gravity of 1,415) or sulfuric acid of a concentration of more than 49° Bé. (spec. gravity of 1,515) be caused to act on cotton a process takes place which is similar to the mercerizing by means of concentrated alkaline lyes and wherein a swelling of the fibers, shrinkage and increase of strength takes place. Bleached and mercerized cotton fabrics which are treated with such an acid assume a gelatinous parchment like appearance and show a considerably stronger affinity to direct acting coloring matters. According to Knecht, (B 37459, 1904, *Journ. Soc. Dyers and Colourists* 1896,89, *Färberzeitung* 95/96 401) the treatment with nitric acid of 42.3° Bé. or more causes besides a weak nitrification, the formation of a very unstable cellulose-ester which decomposes by the action of the water similar to an alkaline cellulose. If nitric acid of a specific gravity of above 1,415 (42.3° Bé.), or sulfuric acid of a specific gravity of above 1,515 (49° Bé.) is caused to act on bleached or mercerized cotton fabrics, these fabrics assume after a short time a gelatinous parchment-like appearance and after a strong tentering i. e. stretching with jigging motion of the treated fabrics they assume a transparent appearance.

The present invention is based on the observation, that the above described gelatinous, parchment-like or transparent effects of strong nitric acid or sulfuric acid on bleached or mercerized cotton fabrics are considerably increased if, instead of using such an acid separately, a nitro-sulfuric acid of from 48 to 50½° Bé. and cooled down to 0° C. or below 0° C. is used that is a liquid obtained by mixing nitric acid of from 40 to 41° Bé. (at a temperature of 15° C.) and sulfuric acid of from 55 to 58° Bé. (at a temperature of 15° C.).

If a nitro-sulfuric acid cooled down to 0° C. or below 0° C. within the lower limit of minus 20° C. and consisting of 1 part by volume of sulfuric acid of from 55 to 58° Bé. and 1 part by volume of nitric acid of from 40 to 41° Bé. is caused to act upon a bleached or mercerized cotton fabric, the fabric assumes after 5 seconds a gelatinous parchment-like appearance whereby the fibers swell and shrink in the longitudinal and transverse directions. The above described morphological modifications of the fabric can be varied at will by using nitro-sulfate acids of different concentration.

If a concentrated nitro-sulfuric acid composed of for instance 1 part by volume of sulfuric acid of 57° Bé. and 1 part by volume of nitric acid of 41° Bé. is used strong parchment-like effects result which, after a tentering or stretching with jigging motion of the treated fabric change over into transparent effects which may be increased by a subsequent mercerizing of the treated fabric.

If bleached or mercerized cotton fabrics are printed on with reserves the treatment of these fabrics with concentrated nitro-sulfuric acid allows of obtaining transparent pattern effects. It will be noted that the treatment of the fabric takes place at temperature below atmospheric temperature and while the fabric is kept stretched. By controlling the temperature and keeping it low the character of the transparent fabric can be varied from a hard feeling fabric at the higher temperatures to a soft feeling fabric at the lower temperatures. On the other hand, if the concentration be but slightly lowered with a corresponding increase in the length of time required for nitration by reason of the lesser concentration, wool-like effects will be obtained, the fabric in this instance not being strongly stretched to allow free deformation of the fibers.

I claim:

1. In the process of producing transparent effects of cotton fabrics, treating the fabric while stretched to nitro-sulfuric acid at a temperature below atmospheric temperature.

2. In the process of producing transparent effects of cotton fabrics, treating the fabric while stretched to nitro-sulfuric acid at temperatures below zero degrees centigrade.

3. The step in the process of producing transparent effects of cotton fabrics which comprises subjecting the fabric to the action of nitro-sulfuric acid cooled from zero degrees to minus twenty degrees centigrade and obtained by mixing equal volumes of sulfuric acid of not less than 57° Bé and nitric acid of not less than 41° Bé.

4. In the process of producing transparent cotton fabrics, treating the fabric while stretched to nitro-sulfuric acid of from 48.3° to 50.5° Bé. at a temperature not over zero degrees centigrade.

5. The process of improving cotton fabrics, which comprises treating the fabric while stretched to the action of a mixture of equal parts of sulpuric acid of not less than 57° Bé. and nitric acid of not less than 40° Bé. at a temperature below zero degrees centigrade, and subjecting the fabric to subsequent mercerization.

6. The process, which comprises subjecting a cotton fabric, while stretched, to nitro-sulfuric acid at a temperature 0° C., and subsequently mercerizing the fabric.

In testimony that I claim the foregoing as my invention, I have signed my name.

GUSTAV ADOLF BOSSHARD.